United States Patent [19]
Gotoh et al.

[11] Patent Number: 5,144,617
[45] Date of Patent: Sep. 1, 1992

[54] OPTICAL INFORMATION READ/WRITE APPARATUS

[75] Inventors: Hiroshi Gotoh, Yokohama; Ikuo Maeda, Kawasaki; Syuichi Honda, Yokohama, all of Japan

[73] Assignee: Ricoh Company, Ltd., Tokyo, Japan

[21] Appl. No.: 610,837

[22] Filed: Nov. 8, 1990

[30] Foreign Application Priority Data

Nov. 16, 1989 [JP] Japan .................................. 1-298267
Jan. 30, 1990 [JP] Japan .................................. 2-19925
Sep. 17, 1990 [JP] Japan .................................. 2-246758

[51] Int. Cl.⁵ ...................... G11B 17/00; G11B 21/16; G11B 7/00
[52] U.S. Cl. ...................................... 369/244; 369/112
[58] Field of Search .................. 369/244, 195, 199, 34, 369/44.14, 44.17, 44.37, 110, 112, 114, 121, 122

[56] References Cited

U.S. PATENT DOCUMENTS

| | | | |
|---|---|---|---|
| 4,371,902 | 2/1983 | Baxter et al. | 360/75 |
| 4,644,515 | 2/1987 | Allebest et al. | 369/34 X |
| 4,683,559 | 7/1987 | Emoto et al. | 369/44 |
| 4,815,059 | 3/1989 | Nakayama et al. | 369/45 |
| 4,926,409 | 5/1990 | Tsuyuguchi et al. | 369/199 X |
| 4,972,396 | 11/1990 | Rafner | 369/34 X |
| 5,072,436 | 12/1991 | Honda | 369/112 |
| 5,073,888 | 12/1991 | Takahashi et al. | 369/112 |

FOREIGN PATENT DOCUMENTS

0210570 11/1984 Japan ................................. 369/199
61-224153 10/1986 Japan .

Primary Examiner—Stuart S. Levy
Assistant Examiner—Michael C. Kessell
Attorney, Agent, or Firm—Cooper & Dunham

[57] ABSTRACT

An optical information read/write apparatus that comprises a casing for installing an optical disk therein and a first movable unit having an objective lens for converging an optical beam on the disk. The lens center moves on a radial direction line originated from the disk center. A first fixed unit is disposed aside the disk in the casing. The fixed unit has an optical source for emitting the beam and constitutes a reading optical pickup in conjunction with the first movable unit. A second movable unit is disposed in the same half side of the disk as the first movable unit. The second movable unit has an objective lens for converging an optical beam on the disk. The lens center of the second unit moves on a radial direction line originated from the disk center. A second fixed unit is disposed aside the disk. The second fixed unit has an optical source for emitting the beam of the second movable unit and constitutes a writing optical pickup in conjunction with the second movable unit.

9 Claims, 6 Drawing Sheets

OPTICAL INFORMATION READ/WRITE APPARATUS

BACKGROUND OF THE INVENTION

1. Field of the Invention

The present invention relates to an optical information read/write apparatus.

2. Description of the Related Art

A hard optical disk is conventionally used for recording optical informations. The informations are written fixedly or unchangeably in advance in the disk. Instead of such a hard disk, an optical read/write disk in which informations can be written and read at any time is being developed.

Such a read/write disk has a larger record capacity than the hard disk, which enables to reduce the cost of the disk per bit. However, the read/write disk has a problem that the access time is long which makes the speed of the data transmission become slow.

In order to solve such a problem, a separation type optical pickup device has been developed. The pickup device is divided to two parts, i.e., a fixed unit and a movable unit. The movable unit is constituted to be light so that it can be moved at a high speed to shorten the access time.

There is another type of optical pickup device to solve the above mentioned problem. This device comprises two pickup units disposed opposite to each other with respect to the axis of the optical disk, one being used for writing informations in the disk while the other being used for reading informations from the disk. This type of optical pickup is called a boxer type pickup device. In accordance with such a double pickup structure, it becomes possible to read the informations for verify check while writing the informations, which enables to raise the speed of the data transmission.

The opticla information read/write apparatus having the above-mentioned double pickup structure is further described below.

The apparatus comprises a casing in which an optical disk is housed and set at the center thereof. The disk is driven to rotate in the casing by a drive means.

Two pickup units are disposed opposite to each other with respect to the rotary axis of the disk. One of the units is used for reading informations from the disk and composed of a fixed element and a movable element which is movable on a guide element for seeking motion. The other unit is used for writing informations on the disk and also composed of a fixed element and a movable element which is movable on a guide element for seeking motion.

Each of the fixed units is mounted on a stationary portion of the casing and has a light source and an optical sensor disposed therein.

Each of the movable units includes an objective lens and an actuator for driving the lens disposed therein.

In accordance with the above-mentioned double pickup structure of the read/write apparatus, since two pickup units have to be disposed in the casing at positions opposite to each other with respect to the axis of the disk, the size of the whole structure becomes large, which sometimes involves in a problem of layout of the apparatus.

One of the arrangements to reduce the size of the apparatus of the double pickup structure is to dispose the two pickup units on the same side with respect to the disk center instead of disposing them in the opposite sides each other with respect to the center. However, in such an arrangement, the guide members for guiding the movable element for seeking motion are disposed side by side in parallel to each other, which makes at least one of the guide members dislocated from the radial direction intersecting the axis of the disk. Therefore, the arrangement can not achieve a desirable seeking movement of the movable unit in which the unit is guided along the radial direction passing through the rotary axis of the disk.

Besides, the optical spot of the scanning laser beam converged on the disk is slightly oval due to the far field pattern of the laser diode of the light source. Therefore, in an inside track of the disk, the angle of the longitudinal direction of the spot with respect to the tracking direction becomes large compared to the angle in an outside track, which causes jitter of the reading signal and error of track positioning.

SUMMARY OF THE INVENTION

The present invention was made considering the above-mentioned points. It is therefore an object of the present invention to provide a novel optical information read/write apparatus which comprises two optical pickup units without enlarging the structure and realiably achieves the read/write operation.

The above-mentioned object of the invention can be achieved by an optical information read/write apparatus comprising:

a casing for installing an optical disk therein;

a first movable unit disposed above the disk and having an objective lens mounted thereon for converging an optical scanning beam on the disk, the unit being movably arranged in such a way that a center of the lens moves on a radial direction line originated from a center of the disk;

a first fixed unit disposed aside the disk in the casing and having an optical source for emitting the scanning beam, the first fixed unit constituting a reading optical pickup in conjunction with the first movable unit;

a second movable unit disposed above the disk in the same half side of the disk as the first movable unit and having an objective lens mounted thereon for converging an optical scanning beam on the disk, the second unit being movably arranged in such a way that a center of the lens of the second unit moves on a radial direction line originated from the center of the disk; and a second fixed unit disposed aside the disk in the casing and having an optical source for emitting the scanning beam of the second movable unit, the second fixed unit constituting a writing optical pickup in conjunction with the second movable unit.

An advantage of the above-mentioned read/write apparatus is that two pickup units can be arranged without enlarging the whole structure of the apparatus and it becomes possible to raise the reliability of seeking function thereof by arranging the two movable elements of the pickup units to move perpendicularly to the tracks of the disk.

Also, another advantage of the apparatus of the present invention is that it becomes possible to realize a small and compact optical information read/write apparatus without lowering the signal sensitivity by the arrangement in which a part of or whole of the optical path for signal detection is arranged to surround the light source.

The optical information read/write apparatus in accordance with the present invention comprises an optical disk driver for rotating the disk, a first optical pickup for writing informations in the disk or erasing the informations and a second optical pickup for reading the informations from the disk.

Each of the optical pickups comprises an optical system for cranking the optical path to deflect the beam.

The informations recorded in the disk is erased with the use of the writing optical pickup.

Each of the optical pickups comprises a fixed unit having a light source and an optical sensor system installed therein. The sensor system of the writing pickup detects the focus error signal and the track error signal which are used for writing or erasing informations. The sensor system of the reading pickup detects the reading signal as well as the focus error signal and the track error signal.

The pickup further comprises a movable unit having an objective lens installed therein as well as an actuator for driving the lens and a driver for moving the movable unit for seeking motion.

The movable unit is guided by a guide unit in the motion for seeking the track on the disk.

The optical system guides the light beam transmitted from the fixed unit to the movable unit.

The writing and reading pickups are disposed in the same side with respect to the rotary axis of the optical disk. Also, each of the pickups are arranged in such a way that the trace of the movement of the lens center aligns with the diametric line of the disk.

It is desirable that a part of or an entire of the optical path of the detection system surround the light source.

Also, it is efficacious to dispose the two pickups symmetrically as a pair of units in the same side with respect to the disk center.

In accordance with the above-mentioned arrangement, it becomes possible to maintain the angle of the longitudinal axis of the optical spot with respect to the tracking direction constant in the inside tracks and the outside tracks of the disk since the lens center moves along the radial direction on the diametric line of the disk.

Also, the optical system cranks the optical path of the beam transmitted from the fixed unit to the movable unit, which makes it possible to dispose the two fixed units close to each other to realize a compact structure.

Further objects and advantages of the present invention will be apparent from the following description of the preferred embodiments of the invention as illustrated in the accompanying drawings.

BRIEF DESCRIPTION OF THE DRAWINGS

FIGS. 8A and 8B are the movable parts of the read/write pickups.

DESCRIPTION OF THE PREFERRED EMBODIMENTS

Embodiments of the present invention are described hereinafter with reference to the drawings in comparison to the related art which is also explained with reference to the drawings.

The embodiments are improved from the structure of the related art illustrated.

Figure 1:
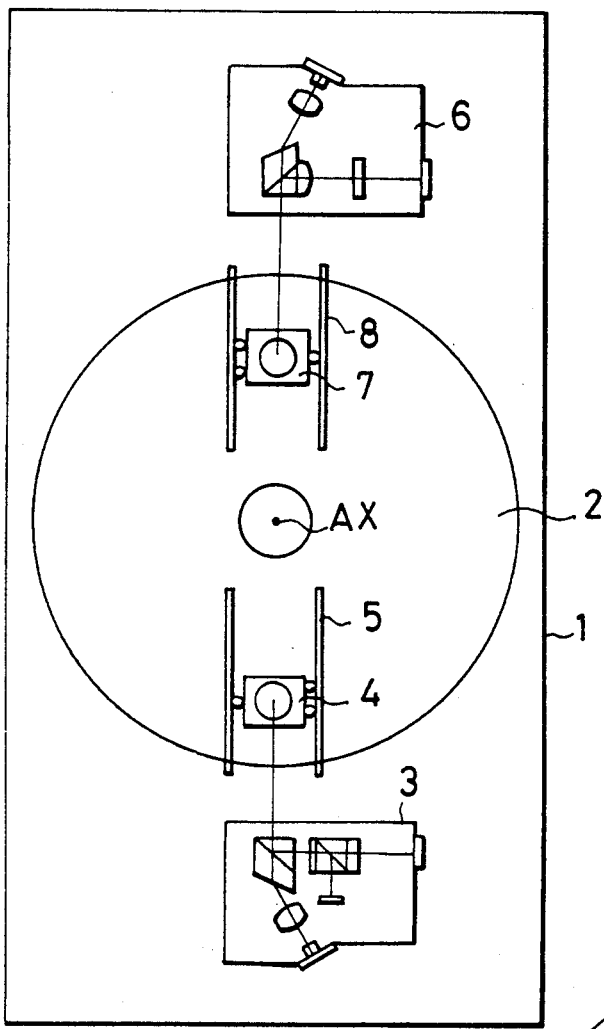
FIG. 1 is a plan view of an example of the optical read/write apparatus in accordance with the related art.

FIG. 1 illustrates an example of the optical information read/write apparatus equipped with a pair of optical pickups.

The apparatus comprises a casing 1 in which an optical disk 2 is housed and set at the center thereof. The disk 2 is driven to rotate in the casing 1 by a drive means (not shown).

Two pickups are disposed opposite to each other with respect to the rotary axis AX of the disk 2. One of the pickups is used for reading informations from the disk 2 and composed of a fixed unit 3 and a movable unit 4 which is movable on a guide unit 5 for guiding the unit 4 in the seeking motion thereof. The other pickup is used for writing informations in the disk 2 and also composed of a fixed unit 6 and a movable unit 7 which is movable on a guide unit 8 for guiding the unit 7 in the seeking motion thereof.

Each of the fixed units 3 and 6 is mounted on a stationary portion of the casing 1 and has a light source and an optical sensor disposed therein.

Each of the movable units 4 and 7 includes an objective lens and an actuator for driving the lens disposed therein.

In accordance with the above-mentioned double-pickup structure of the read/write apparatus, since two pickups have to be disposed in the casing 1 at positions opposite to eah other with respect to the axis AX of the disk 2, the size of the whole structure becomes large, which sometimes involves in a problem of layout of the apparatus.

Figure 2:
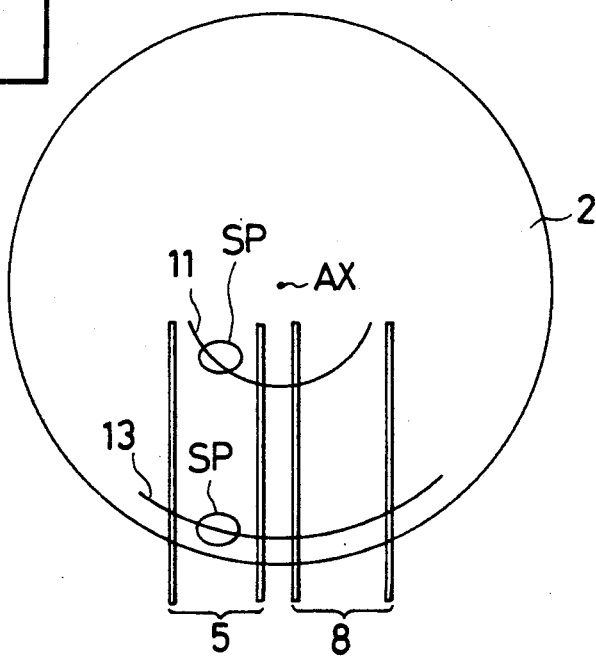
FIG. 2 is an explanatory view for explaining the problems of the related art structure.

One of the arrangements for making the size of the apparatus of the double pickup structure small is to dispose the two pickups on the same side with respect to the disk center instead of disposing them in the opposite sides each other with respect to the center, as illustrated in FIG. 2. However, in such an arrangement, the guide members 5 and 8 for guiding the movable units are disposed side by side in parallel to each other, which makes at least one of the guide members dislocated from the radial direction intersecting the axis of the disk. Therefore, the arrangement can not achieve a desirable seeking movement of the movable unit in which the unit is guided along the diametric line in the radial direction passing through the rotary axis of the disk.

In FIG. 2, the longitudinal center line of each of guides 5 and 8 is dislocated from the diametric line of the disk 2.

Besides, as illustrated in FIG. 2, the optical spot SP of the scanning laser beam converged on the disk 2 is slightly oval due to the far field pattern of the laser diode of the light source. Therefore, on an inside track 11 of the disk 2, the angle of the longitudinal direction of the spot SP with respect to the tracking direction becomes large compared to the angle in an outside track 13, which causes jitter of the reading signal and error of track positioning.

The above-mentioned problems can be obviated by the embodiments of the present invention described below.

Figure 3:
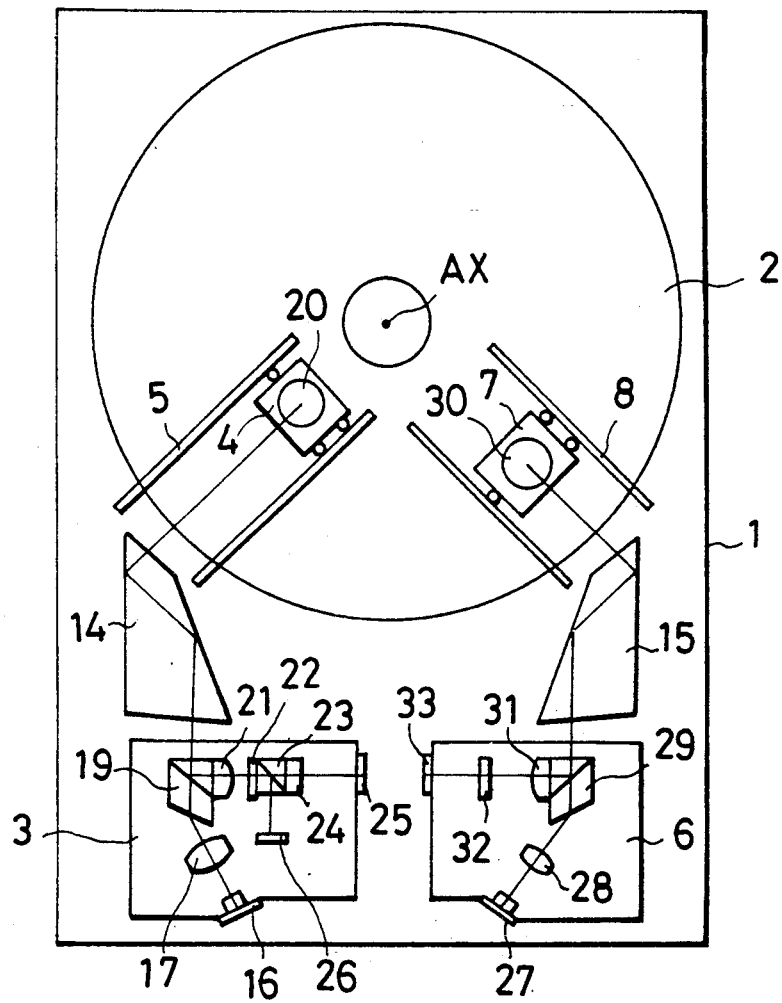
FIG. 3 is a plan view of an embodiment of the optical read/write apparatus in accordance with the present invention.

FIG. 3 illustrates an embodiment of the optical information read/write apparatus in accordance with the present invention.

The apparatus comprises a casing 1, an optical disk 2, a reading pickup and a writing pickup. The reading pickup is composed of a fixed unit 3, a movable unit 4 and a seeking guide 5. The writing pickup is composed of a fixed unit 6, a movable unit 7 and a seeking guide 8. The reading movable unit 4 carries an objective lens 20 thereon. The writing movable unit 7 carries an objective lens 30 thereon.

A prism 14, 15 is arranged for each of the pickups for cranking the optical path of the beam and deflecting the beam.

The two fixed units 3 and 6 are disposed side by side on the stationary portion of the casing 1.

Each of the guides 5 and 8 is disposed in such a way that each unit 4, 7 is guided in the radial direction on the diametric line of the disk 2. Therefore, the trace line of the motion of each lens 20, 30 intersects the rotary axis AX of the disk 2 on the extension thereof.

The prism 14 is disposed between the unit 3 and the guide 5. Similarly, the prism 15 is disposed between the unit 6 and the guide 8.

The reading pickup functions to read optical informations from the disk as follows.

A laser beam is emitted from a light source laser diode 16. The beam is collimated by a coupling lens 17 and passes through a beam splitter 19 which is combined with a beam shaping prism to constitute an optical element as one unit. The beam then outputs from the fixed unit 3 and enters into the prism 14.

Figure 4:
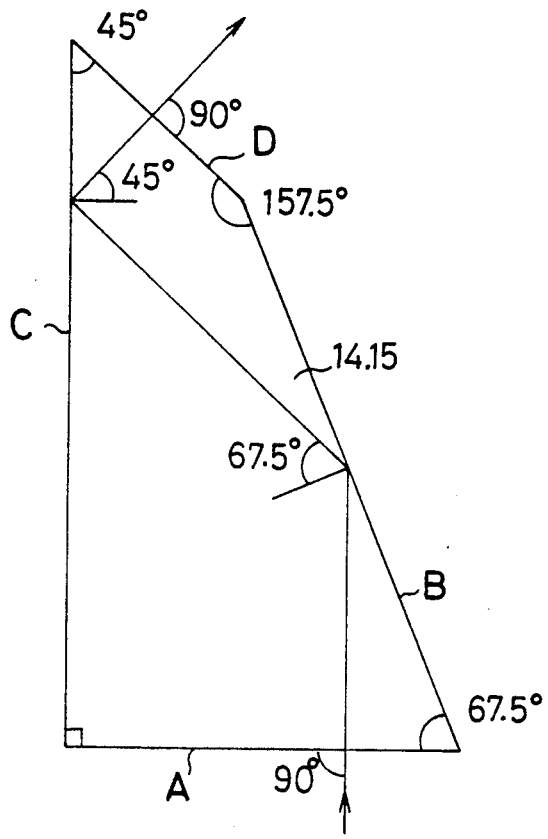
FIG. 4 is an explanatory view of an example of the prism for cranking the optical path in accordance with the present invention.

FIG. 4 illustrates the prism 14 in detail. The prism 14 has four surfaces A, B, C and D. The apex angles between the surfaces A and B, B and C, C and D, and D and A are 68.5 degrees, 157.5 degrees, 45 degrees and 90 degrees, respectively, as illustrated in FIG. 4.

The beam enters into the prism 14 from the surface A. In the prism 14, the beam is totally reflected on the surfaces B and C and outputs from the surface D. The incident angle of the beam on the surface A is 90 degrees. Also, the output angle of the beam with respect to the surface D is 90 degrees. The angle of the output beam from the surface D is 45 degrees with respect to the optical path of the beam from the fixed unit 3 to the prism 14. The direction of the output beam from the surface D is aligned with the direction of the seeking motion of the unit 4 guided by the guide 5. The beam enters into the unit 4 and deflected to align with the optical axis of the lens 20 by a deflection prism mounted on the unit 4. After that, the beam is converged by the lens 20 on the disk surface to form a optical spot on the disk 2. The unit 4 is moved along the guide 5 to seek a desired track on the disk 2 to irradiate the track by the spot.

The optical spot is reflected on the disk surface. A part of the light reflected from the disk 2 enters into the lens 20 and propagates back to the fixed unit 3 along the same optical path as the forward path through the same optical elements.

In the unit 3, the reflection light is reflected by the beam splitter 19 toward the condenser lens 21 which converges the light. The light then enters into a half wave plate 22 which rotates the polarization plane of the light by 45 degrees. After that, the light is divided to a P-polarization component and an S-polarization component by a polarization beam splitter 23. The S-polarization component propagates to an optical sensor element 26. The P-polarization component passes through a cylindrical lens 24 through which astigmatism is generated in the light. The light then enters into an optical sensor 25 which is divided to four elements.

The photo-magnetic reading signal of information is obtained from the difference of the outputs between the sensors 25 and 26.

Also, the focus error signal is obtained from the astigmatism of the light. The track error signal is obtained from the output of the sensor 25 by the far field method.

The writing pickup functions to write informations in the disk as follows.

A laser beam is emitted from a light source laser diode 27. The beam is collimated by a coupling lens 28. The beam then enters into a beam splitter 29 which is combined with a beam shaping prism to form an optical element as one unit. After passing through the beam splitter 29, the beam outputs from the unit 6 and entersw into the prism 15.

The prism 15 has the same shape as the prism 14 as illustrated in FIG. 4 and disposed symmetric with respect to the prism 14.

The beam outputs from the prism 15 in a direction inclined 45 degrees couterclockwise with respect to the optical path of the beam from the fixed unfit 6 to the prism 15. The output direction of the beam from the prism 15 is aligned with the direction of the motion of the unit 7 being moved on the guide 8. The beam output from the prism 15 enters into the unit 7. The beam is deflected to align with the optical axis of the lens 30 by a prism mounted on the unit 7 and converged on the disk 2 by the lens 30 to form an optical spot thereon. The unit 7 is moved along the guide 8 to seek a desired track on the disk 2 so that the desired track is accessed and irradiated by the spot to write informations.

The laser beam irradiated on the disk surface is reflected thereupon and a part of the reflected light enters into the lens 30. The reflection light propagates back from the lens 30 to the unit 6 along the same path as the path of the forward propagation of the beam through the same optical elements.

In the unit 6, the reflection light is reflected by the beam splitter 29 and converged by a condenser lens 31. The light then passes through a cylindrical lens 32 which generates astigmatism in the beam while passing therethrough. After that, the light is received by an optical sensor 33 which is divided to four elements.

The focus error signal is obtained from the astigmatism in the reflection light. The track error signal is obtained from the output of the sensor 33 by the far field method.

As mentioned above, in accordance with the embodiment of the invention, the units 3 and 6 emit optical beams in parallel with each other. The beams are deflected by 45 degrees in the opposite directions to each other by the prisms 14 and 15, respectively, so that the beam directions become perpendicular to each other. Also, the guides 5 and 8 are arranged in such a way that the guiding directions of the two guides intersect perpendicularly with each other at the rotary axis AX of the disk 2.

It is to be noted that the surfaces B and C of the prism 14, 15 illustrated in FIG. 4 are coated with a multi-layered total reflection film which is adjusted so that the phase change of the reflected light is minimized. Also, the surfaces A and D of the prism are coated with an anti-reflection film.

Figure 5:
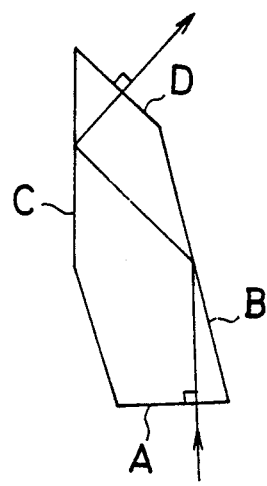
FIG. 5 is an explanatory view of another example of the prism for cranking the optical path in accordance with the present invention.

FIG. 5 illustrates another example of the prism for deflecting the optical path of the beam. The prism of FIG. 5 differs from the prism of FIG. 4 in that the right angle apex between the surfaces A and C (FIG. 4) is cut away to make the prism small.

It is to be noted that the angle of the optical path of the beam with respect to each of the surfaces A and D may be slightly inclined from the right angle so as to prevent the reflection light reflected on the surface from propagating back to the fixed unit as flare light.

Figure 6:
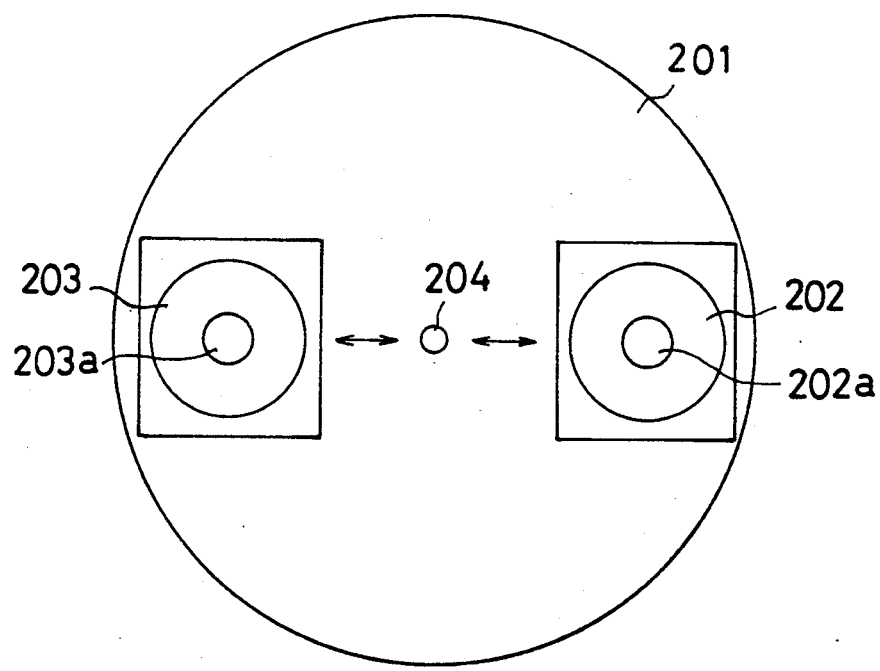
FIG. 6 is an explanatory view for explaining another example of the read/write apparatus in accordance with the related art.

FIG. 6 illustrates another example of the read/write apparatus in accordance with the related art.

Numeral 201 designates a photo-magnetic disk. Numerals 202 and 203 designate optical pickups having an objectives lens 202a, 203a, respectively. The pickups 202 and 203 move in the direction as illustrated by arrows in FIG. 6. The apparatus is constituted as a boxer type apparatus in which the two pickups 202 and 203 are disposed in the sides opposite to each other with respect to the rotary center 204 of the disk 201.

The structure of FIG. 6 has a problem that the apparatus becomes large since the pickups are disposed diametrically opposite sides on the disk. It is difficult to simply dispose the two pickups in the same side close together since the pickup itself is relatively large. With respect to an apparatus which uses a 3.5-inch disk or a half-height drive apparatus, it is especially desired to make the construction compact to realize a small size read/write apparatus.

The embodiments of the present invention described below obviate the above-mentioned problem.

Figure 7:
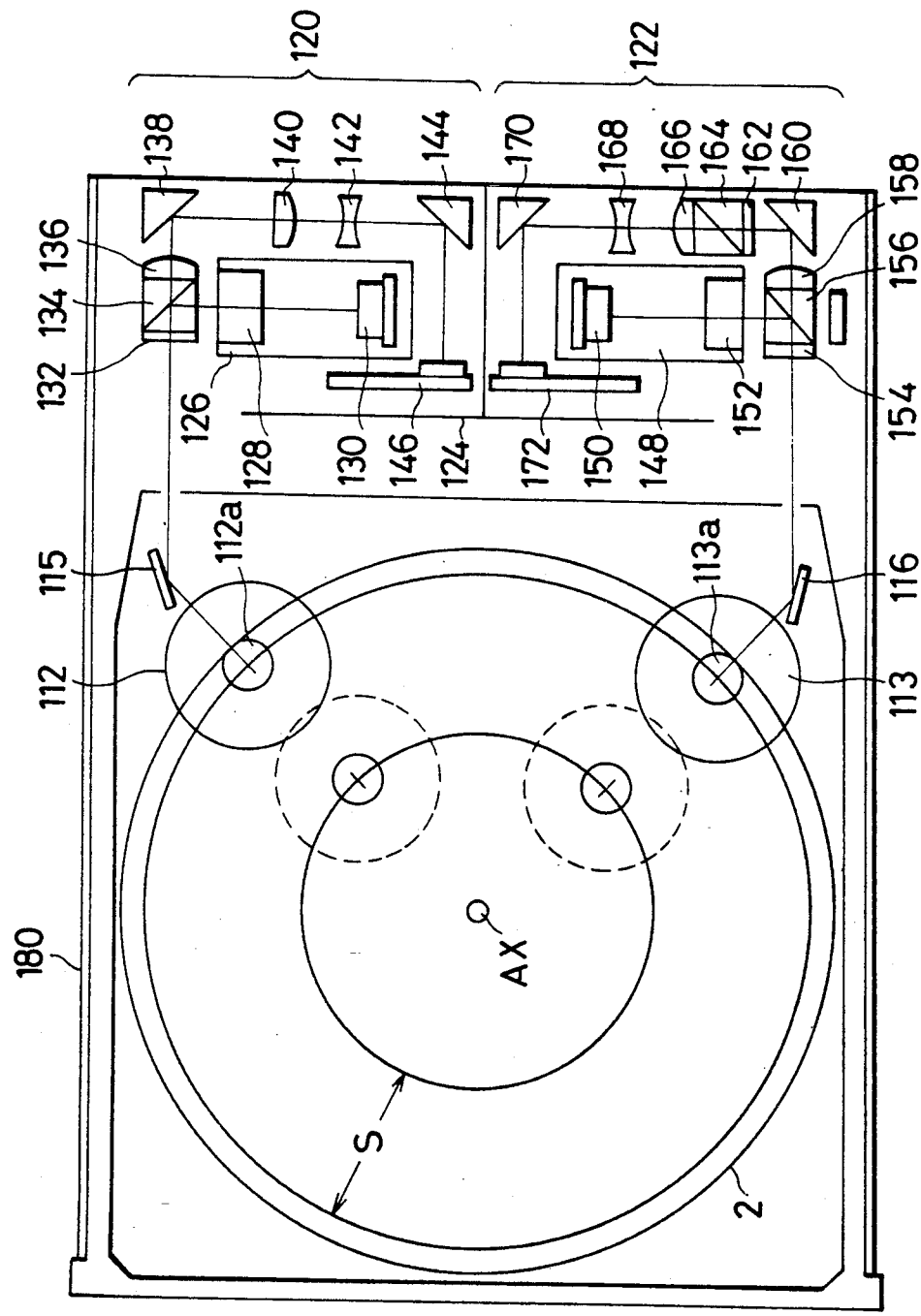
FIG. 7 is a plan view of another embodiment of the read/write apparatus in accordance with the present invention.

FIG. 7 illustrates an embodiment of the optical information read/write apparatus.

The apparatus is designated by numeral 180 as a whole. Numeral 2 designates an optical disk which has an information recording area designated by reference letter S. Numerals 112 and 113 designate movable units of a recording pickup and a reading pickup, resectively, disposed in a half side of the disk 2. The directions of movement of units 112 and 113 and perpendicular to each other. Each unit 112, 113 has an objective lens 112a, 113a, respectively, mounted thereon. In one side of the disk 2 (right side in the drawing), there are two fixed units 120 and 122 of the recording pickup and the reading pickup, respectively, disposed side by side. The units 120 and 122 are separated by a partition 124.

The unit 120 for the recording (writing) pickup comprises a light source 126 that is composed of a laser diode 130 and a coupling lens 128. the laser diode 130 emits a laser beam which passes through the coupling lens 128 and reflected by a polarization beam splitter 134 toward a quarter-wave plate 132. After passing through the quarter-wave plate 131, the beam is reflected by a mirror 115 to the unit 112 where the beam is converged on the disk 2 by the lens 112a to form a minute optical spot thereon.

The beam is reflected on the disk surface. The reflection light enters into the lens 112a and propagates back to the beam splitter 134 through the mirror 115 and the quarter-wave plate 132. The polarization plane of the beam is rotated by the quarter-wave plate so that the beam penetrates through the beam splitter 134. The beams then propagates through a condenser lens 136, a mirror 138, a half prism 140, a concave lens 142 and a mirror 144 to an optical sensor element 146.

As can be seen from FIG. 7, the optical system is arranged in such a way that the optical path of the reflection light from the lens 112a to the sensor 146 surrounds the light source unit 126, which makes it possible to make the structure compact. The arrangement of the optical elements for surrounding the light source is not limited to that illustrated in FIG. 7. It may be arranged so that only a part of the optical path surrounds the light source unit 126.

Such an arrangement is also applied to the unit 122 of the reading optical pickup. That is, the unit 122 comprises an optical source unit 148 including a laser diode 150 and a coupling lens 152. The laser beam emitted from the laser diode 150 propagated through the lens 152 to a polarization beam splitter 156 which reflects the beam toward a quarter-wave plate 154. Passing through the quarter-wave plate, the beam is reflected by a mirror 116 to the lens 113a of the movable unit 113 and converged by the lens 113a on the disk 2 to form an optical spot thereon. The beam is reflected on the disk surface. A part of the reflected light is received by the lens 113a and proagates back through the mirror 116 and the quarter-wave plate 154 to the beam splitter 156. The reflection light penetrates through the beam splitter 156 since the phase plane thereof is rotated by the quarter-wave plate 154. The light further propagates through a condenser lens 158, a mirror 160, a half-wave plate 162, a Wollaston prism 164, a half prism 166, a concave lens 168 and a mirror 179 to an optical sensor element 172.

The mirrors 116, 160 and 170 are disposed in such an arrangement that the optical path of the reflection light surrounds the optical source unit 148, whereby the structure of the apparatus becomes compact.

It is to be noted that with respect to the method for obtaining the tracking signal, focusing signal or information data signal, any appropriate technique can be applied to the above mentioned structure of the embodiments of the present invention.

Also, the embodiment of FIG. 7 further comprises other necessary optical elements actually such as a galvanomirror, etc. Which are delected from the drawing for the sake of clarification.

Figure 8:
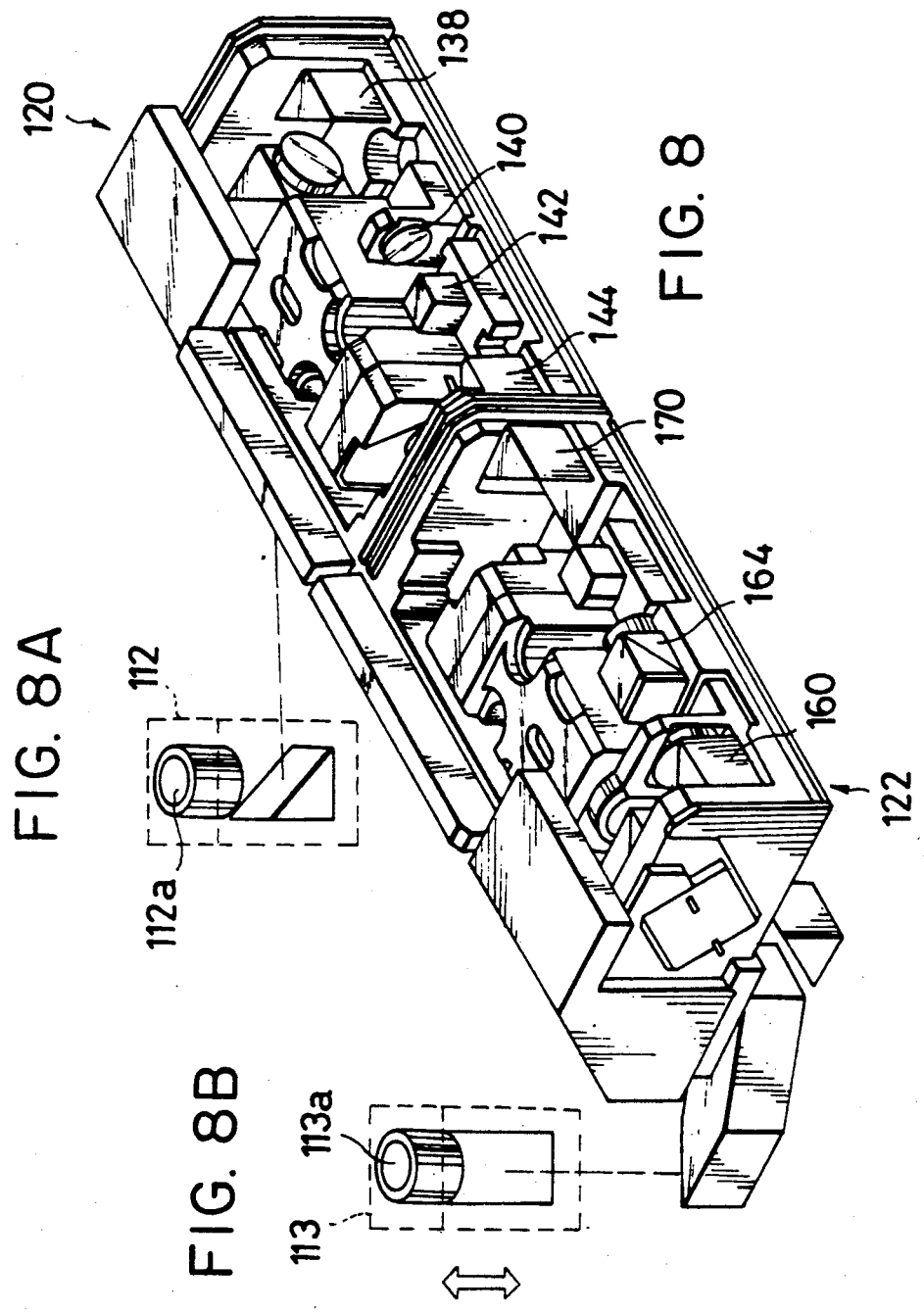
FIG. 8 is a perspective view of a part of the apparatus of FIG. 7.

FIG. 8 illustrates the fixed units 120 and 122 oif the writing and reading pickups in conjunction with the movable units 112 and 113, respectively, of the read/write apparatus of FIG. 7.

Figure 9:
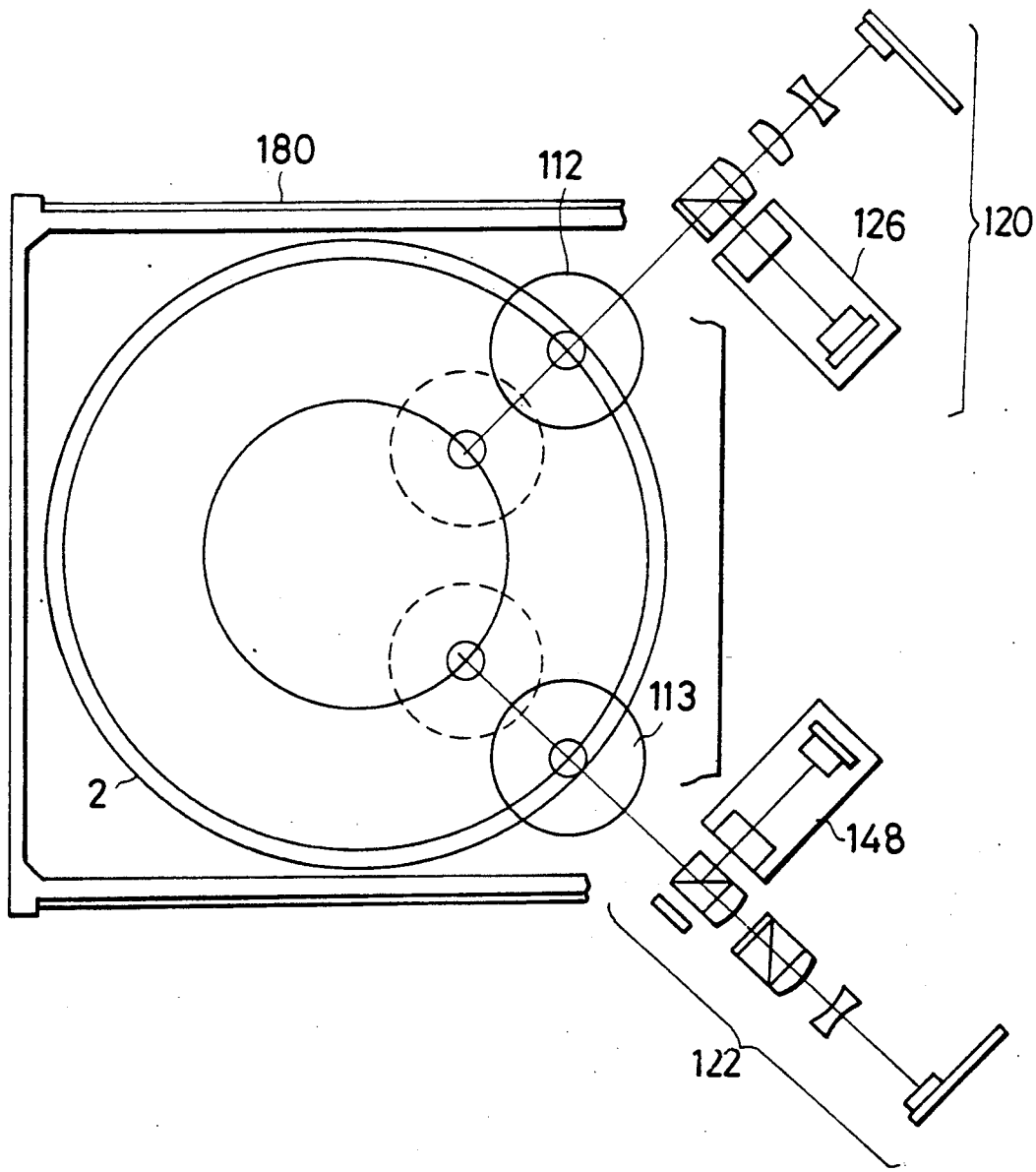
FIG. 9 is a plan view of a variant of the embodiment of the present invention.

FIG. 9 illustrates another embodiment of the optical information read/write apparatus in accordance with the present invention.

In this embodiment, the movable units 112 and 113 are arranged in the same way as the embodiment of FIG. 7. However, the optical path of the signal detection light in each of the fixed units 120 and 122 is not arranged to surround the light source unit 126, 148. The present invention includes such a structure.

Many widely different embodiments of the present invention may be constitutee without departing from the spirit and scope of the present invention. It should be understood that the present invention is not limited to the specific embodiments described in the specification, except as defined in the appended claims.

What is claimed is:

1. An optical information reading and writing apparatus comprising:

a casing having a longitudinal axis and a lateral axis, said axes crossing at a predetermined point;

an optical disk disposed within said casing and having a center positioned at said predetermined point;

a first fixed unit fixed to said casing and having a first light source means for emitting a first light beam, and a first detection means;

a first movable unit disposed below said optical disk having a first objective lens for converging said emitted first light beam on said optical disk, and adapted such that a center of said first objective lens moves on a radial direction line originating from said center of said optical disk, said first movable unit constituting a reading optical pickup in conjunction with said first fixed unit;

a second fixed unit fixed to said casing and having a second light source means for emitting a second light beam, and a second detection means, said second fixed unit being juxtaposed with said first fixed unit;

a second movable unit disposed below said optical disk having a second objective lens for converging said emitted second light beam on said optical disk, and adapted such that a center of said second objective lens moves on another radial direction line originating from said center of said optical disk, said second movable unit constituting a writing optical pickup in conjunction with said second fixed unit;

both of said first and second units being disposed on the same one-half of one side of said disk;

a first deflection means disposed between said first fixed unit and said first movable unit for deflecting said first light beam toward said first movable unit and for deflecting a first reflection light beam reflected from said optical disk and passing through said first objective lens toward said first detection means; and a second deflection means disposed between said second fixed unit and said second movable unit for deflecting said second light beam toward said second movable unit and for deflecting a second reflection light beam reflected from said optical disk and passing through said second objective lens toward said second detection means, said first deflection means comprising a first prism having a first surface which permits said first light beam to enter at a substantially right angle, a second surface disposed so as to cross said first surface at an acute angle for reflecting said entered first light beam, a third surface extending so as to cross perpendicularly to said first surface and disposed opposite said second surface for reflecting a light beam reflected from said second surface, and a fourth surface disposed so as to cross said second surface and said third surface for permitting said reflected light beam from said third surface to be emitted from said fourth surface, said second deflection means comprising a second prism having another first surface which permits said second light beam to enter at a substantially right angle, another second surface disposed so as to cross said another first surface at an acute angle for reflecting said entered second light beam, another third surface extending so as to cross perpendicularly to said another first surface and disposed opposite said another second surface for reflecting a light beam reflected from said another second surface, another fourth surface disposed so as to cross said another second surface and said another third surface for permitting said reflected light beam from said another third surface to be emitted from said another fourth surface.

2. An optical information reading and writing apparatus according to claim 1, which is adapted such that said radial direction line and said another radial direction line cross perpendicularly to each other.

3. An optical information reading and writing apparatus according to claim 1, in which each of said second surface, said another second surface, said third surface and said another third surface is coated with a multi-layered total reflection film which is prepared such that a phase change of a light beam reflected therefrom is minimized, and each of said first surface, said another first surface, said fourth surface and said another fourth surface is coated with an anti-reflection film.

4. An optical information reading and writing apparatus comprising:

a casing having a longitudinal axis and a lateral axis, said axes crossing at a predetermined point;

an optical disk disposed within said casing and having a center positioned at said predetermined point;

a first fixed unit fixed to said casing, and having a first light source for emitting a first light beam, and a first detection means;

a first movable unit disposed below said optical disk, having a first objective lens for converging said emitted first light beam on said optical disk, and adapted such that a center of said first objective lens moves on a radial direction line originated from said center of said optical disk, said first movable unit constituting a reading optical pickup in conjunction with said first fixed unit;

a second fixed unit fixed to said casing, and having a second light source for emitting a second light beam, and a second detection means, said second fixed unit being juxtaposed with said first fixed unit;

a second movable unit disposed below said optical disk having a second objective lens for converging said emitted second light beam on said optical disk, and adapted such that a center of said second objective lens moves on another radial direction line originated from said center of said optical disk, said second movable unit constituting a writing optical pickup in conjunction with said second fixed unit;

both of said first and second units being disposed on the same one-half of one side of said disk;

a first deflection means disposed between said first fixed unit and said first movable unit for deflecting said first light beam toward said first movable unit and for deflecting a first reflection light beam reflected from said optical disk and passing through said first objective lens toward said first detection means; and a second deflection means. disposed between said second fixed unit and said second movable unit for deflecting said second light beam toward said second movable unit and for deflecting a second reflection light beam reflected from said optical disk and passing through said second objective lens toward said second detection means, said first fixed unit comprising a first polarization beam splitter disposed on an optical path of said first light beam for receiving said first light beam and propagating said first light beam toward said first deflection means, and for receiving said first reflection light beam reflected from said optical disk through said first deflection means said first light source being positioned in a substantially central portion of a space to be occupied by said first fixed unit such that said first polarization beam splitter and said first detection means can be disposed in a remaining portion of said space, a first mirror being disposed on a first optical path of said reflection light beam split by said first polarization beam splitter so as to reflect said split reflection light beam in a second optical path perpendicular to said first optical path to thereby propagate said reflected light beam from said first mirror into said remaining portion of said space, first constitutional elements of said first detection means being respectively arranged on said first optical path and said second optical path, said second fixed unit comprising a second polarization beam splitter disposed on an optical path of said second light beam for receiving said second light beam and propagating said second light beam toward said second deflection means, and for receiving said second reflection light beam reflected from said optical disk through said second deflection means said second light source being positioned in a substantially central portion of another space to be occupied by said second fixed unit such that said second polarization beam splitter and said second detection means can be disposed in a remaining portion of said another space, another first mirror being disposed on another first optical path of said reflection light beam split by said second polarization beam splitter so as to reflect said split reflection light beam in another second optical path perpendicular to said another first optical path to thereby propagate said reflected light beam from said another first mirror into said remaining portion of said another space, second constitutional elements of said second detection means being respectively arranged on said another first optical path and said another second optical path.

5. An optical information reading and writing apparatus according to claim 4, in which said first constitutional elements comprise a half-wave plate, a Wollaston prism, a first half prism, a first concave lens and a first optical sensor, and said second constitutional elements comprise a second half prism, a second concave lens and a second optical sensor.

6. An optical information reading and writing apparatus according to claim 4, in which said first deflection means comprises a first reflection mirror, and said second deflection means comprises a second reflection mirror.

7. An optical information reading and writing apparatus according to claim 4, which further comprises a second mirror disposed on said second optical path for reflecting said reflected light beam from said first mirror in a third optical path perpendicular to said second optical path, and another second mirror disposed on said another second optical path for reflecting said reflected light beam from said another first mirror in a third optical path perpendicular to said another second optical path, said first constitutional elements of said first deflection means being respectively arranged on said second optical path and said third optical path, said second constitutional elements of said second detection means being respectively arranged on said another second optical path and said another third optical path.

8. An optical information reading and writing apparatus according to claim 7, in which said first constitutional elements comprise a half-wave plate, a Wollaston prism, a first half prism, a first concave lens and a first optical sensor, said half-wave plate, said Wollaston prism, said first half prism and said first concave lens being disposed on said second optical path, said first optical sensor being disposed on said third optical path, and said second constitutional elements comprise a second half prism, a second concave lens and a second optical sensor, said second half prism and said second concave lens being disposed on said another second optical path, said second optical sensor being disposed on said another third optical path.

9. An optical information reading and writing apparatus according to claim 7, in which said first deflection means comprises a first reflection mirror, and said second deflection means comprises a second reflection mirror.

* * * * *